United States Patent

Kivari et al.

[11] Patent Number: 5,987,639
[45] Date of Patent: Nov. 16, 1999

[54] DATA DECODING LOGIC IN A MOBILE PHONE

[75] Inventors: Raimo Kivari, Haukipudas; Seppo Eerik Salow, Oulu, both of Finland

[73] Assignee: Nokia Mobile Phones Ltd., Salo, Finland

[21] Appl. No.: 07/823,153

[22] Filed: Jan. 21, 1992

[51] Int. Cl.⁶ ................................................ H04L 1/08
[52] U.S. Cl. ............................................ 714/822; 714/797
[58] Field of Search .................... 371/69.1, 36, 37.1, 371/37.2, 37.7, 37.9; 364/265, 265.1, 265.2, 269.1, 737, 942.8, 943.9, 944.5

[56] References Cited

U.S. PATENT DOCUMENTS

| | | | |
|---|---|---|---|
| 4,675,868 | 6/1987 | Shishikura et al. | 371/37 |
| 4,709,376 | 11/1987 | Kage | 371/36 |
| 4,763,331 | 8/1988 | Matsumoto | 371/37 |
| 4,794,601 | 12/1988 | Kikuchi | 371/36 |
| 4,965,820 | 10/1990 | Sharpe et al. | 379/59 |
| 5,241,548 | 8/1993 | Dillon et al. | 371/69.1 |

Primary Examiner—Trinh L. Tu
Attorney, Agent, or Firm—Darby & Darby

[57] ABSTRACT

The data decoding logic arrangement of the invention provides 3/5 voting on data blocks received (1) in a frame. The decoded data (12) is preferably clocked out during reception of the first data block of the next frame, in synchronism with the clock frequency (2) generated from the received data bit flow. The inventive procedure is used on FOCC and FVC channels in the TACS/AMPS mobile phone system.

11 Claims, 2 Drawing Sheets

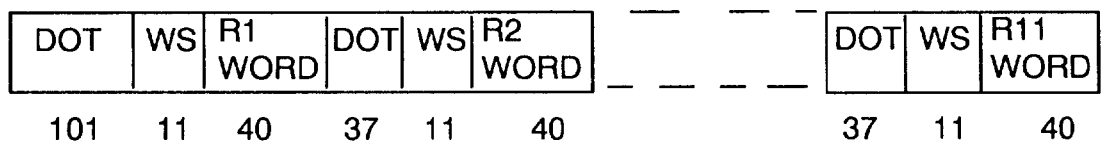
Fig. 3a (FVC)
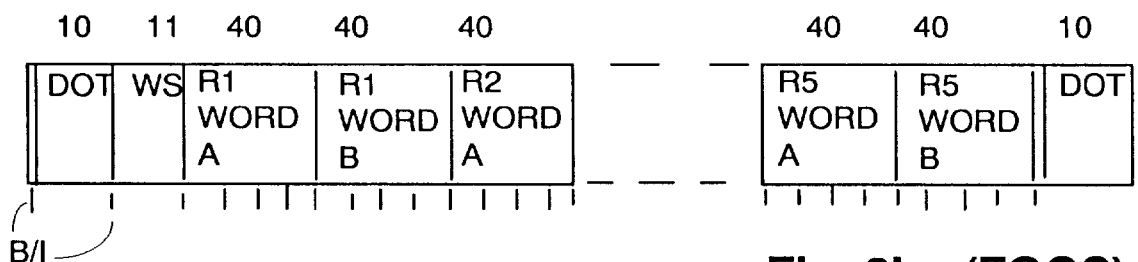
Fig. 3b (FOCC)

DATA DECODING LOGIC IN A MOBILE PHONE

The invention relates to a data decoding logic arrangement in a mobile phone according to the preamble of claim 1.

BACKGROUND OF THE INVENTION

The North American TACS/AMPS mobile phone system provides a three out of five voting arrangement on data received by the mobile phone, this data being e.g. the Forward Control Channel (FOCC) data or Forward Voice Channel (FVC) data, which is sent from a base station in frames containing data blocks repeated at least five consecutive times. This 3/5 voting may be performed in a straight forward way, e.g. by a microprocessor which stores five received data blocks in a memory and then performs a voting procedure on all received five data blocks in accordance with a code or algorithm stored in the processor program memory. The voting and coding may also be performed mainly by hardware when the data blocks are stored in at least five registers, and the above mentioned algorithm is performed by logic circuits.

In a copending U.S. patent application Ser. No. 07/823,167, filed simultaneously with this application and titled "Method and circuit for performing 3/5 major voting", the inventors have presented a new and inventive arrangement which performs the voting process in a logic, which in a preferred form contains only two data registers to store relevant data. The present inventive arrangement in its preferred form utilizes this new voting arrangement. The present invention is however not limited to use the mentioned 3/5 voting arrangement, as a person skilled in the art can devise other suitable voting arrangements to operate as the voting block of the present invention.

SUMMARY OF THE INVENTION

Now the inventors have found that an arrangement for decoding and voting an incoming data stream is advantageously performed in accordance with the characterizing part of claim 1, so that the voting and decoding result is obtained in real time, immediately and in synchronism with the incoming data bit flow.

In a preferred embodiment the present inventive arrangement enables the mobile phone microprocessor to be stopped during the voting and decoding process, thus saving precious battery power.

In a further embodiment the inventive arrangement receives and decodes FOCC data, received in a frame with five repeating data blocks. In another embodiment the received data consists of the FVC data with 11 repeating data blocks in a frame, and then the arrangement advantageously can decode the data two times within a frame and select the better result in order to increase receiving quality.

BRIEF DESCRIPTION OF THE DRAWINGS

The inventive arrangement is further described by an example, referring to the enclosed drawing, where FIG. 3a shows the format of the FVC data stream, and FIG. 3b shows the format of the FOCC data stream.

DESCRIPTION OF THE PREFERRED EMBODIMENTS

Figure 1:
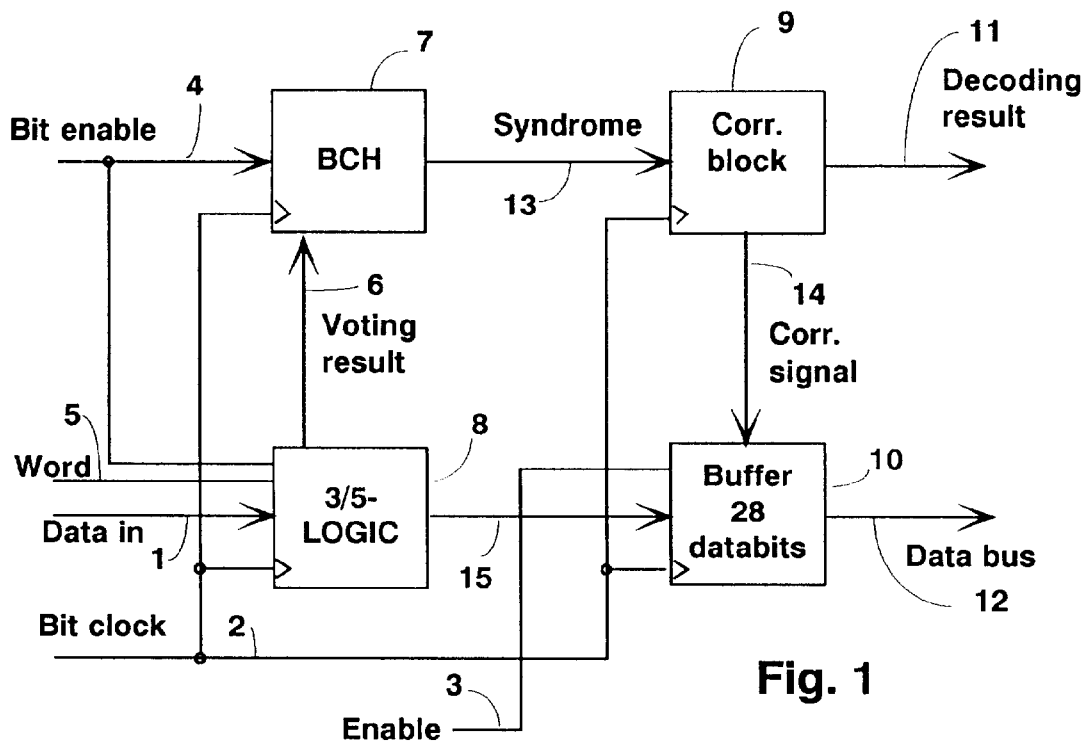
FIG. 1 shows a simplified block diagram of the inventive arrangement.

The arrangement in FIG. 1 consists of a BCH decoding block 7 (BCH=Bose-Chaudhuri-Hocquenghem coding/decoding), a correction block 9, a 3/5 voting logic 8, and a data buffer 10. In the case presented in the figures, this inventive arrangement in a mobile phone receives on the line 1 an incoming data bit stream, which contains Forward Voice Channel (FVC) and Forward Control Channel (FOCC) data. The data streams are sent to the mobile station from a base station or a land station in a TACS/AMPS mobile phone system. The data is generated at a 10 kb/s±0,1 b/s rate. According to the system standards the data is embedded in frames, which are depicted in FIGS. 3a and 3b.

The FVC channel data stream according to FIG. 3a contains a bit synchronizing or dotting sequence DOT (37 bits, except at the first repeat of the word, where the 101-bit dotting sequence is used) and a word synchronizing sequence WS (11 bits) to permit the mobile station to achieve synchronization with the incoming data. Each word R(x)/WORD contains 40 bits, including parity, and is repeated 11 times (x=1 . . . 11) together with the 37-bit dotting and 11-bit word sync sequences.

FIG. 3b shows the format of the FOCC message stream, in the direction land-to-mobile. Each FOCC channel consists of three discrete information streams, called stream A, B and busy-idle stream, that are time multiplexed together. Messages to mobile stations with the least-significant bit of their mobile identification number equal to '0' are sent on stream A, and those with the least-significant bit of their mobile identification number equal to '1' are sent on stream B. The busy-idle stream contains busy-idle bits B/I, located at the beginning of each word sync sequence, at the beginning of the first repeat of word A, and after every 10 message bits thereafter.

A 10-bit dotting sequence and an 11-bit word sync sequence are sent to the mobile station to permit the mobile station to achieve synchronization with the incoming data. Each word R(x)/WORD contains 40 bits, including parity, and is repeated 5 times (x=1 . . . 5); it is then referred to as a word block.

Figure 2:
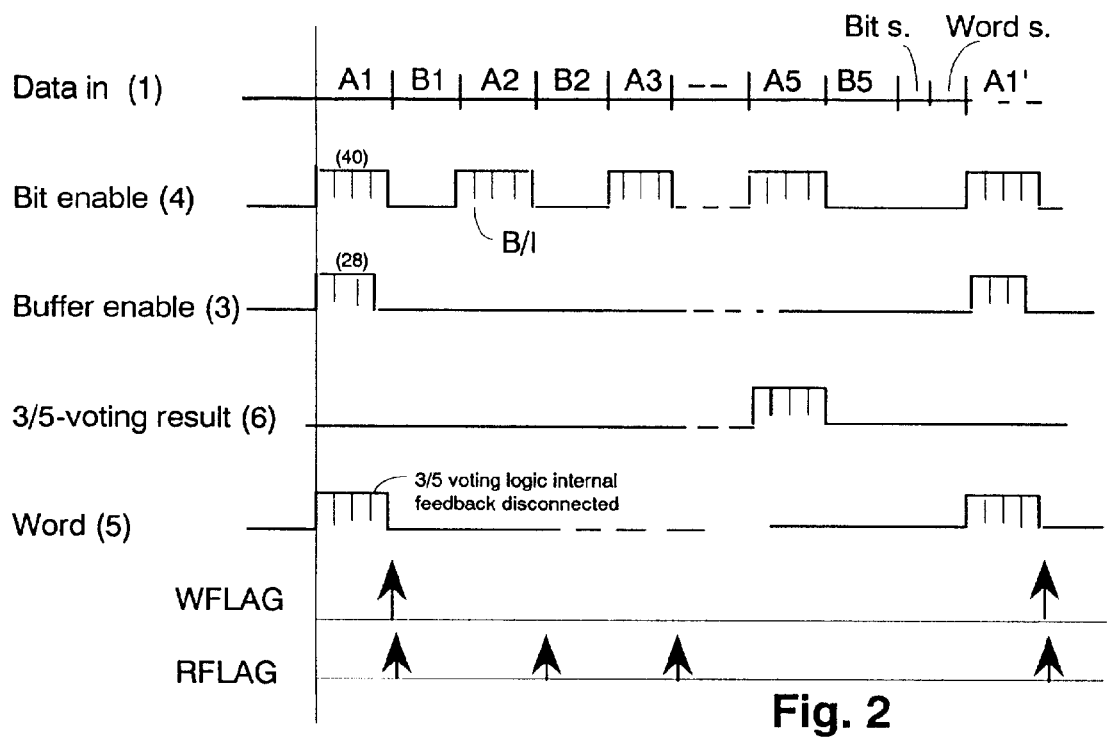
FIG. 2 shows essential signals of the arrangement in FIG. 1, as a simplified time diagram for Forward Control Channel (FOCC) data.

Corresponding word blocks A1–A5, B1–B5, are shown in FIG. 2 (data in, 1). The word blocks A1–A5, as well as B1–B5 have an identical structure, i.e. a 40 bit long data block on channel A is repeated 5 times in order to increase data transmission reliability. Channels A and B contain data independent of each other. The receiving control logic (not shown in the figure) selects either channel A or B to be monitored and received.

The inventive arrangement can be used on the Forward Control Channel (FOCC) as well as on the Forward Voice Channel (FVC).

During operation on the FOCC channel the 3/5 voting logic 8 receives the first four data blocks A1–A4, enabled by the bit enable 4 signal, and calculates the number of ones and zeros in each bit position of each received block A1 to A4 (or B1 to B4). During the first data block the control line word 5 enables internal feedback (not shown) in the voting logic to be disconnected, which essentially is equivalent to resetting the voting operation between consecutive frames. During the second, third and fourth data block a normal weighting operation is performed in the voting logic.

When the fifth repeating block A5 starts, the reception is also enabled by the bit enable signal 4, and the calculated weighted values from the 3/5 logic are directed through an AND-gate (not shown), which then performs the actual three out of five voting, a majority voting process performed bit for bit for all bits in the received frame. The voting result 6 of the 3/5 logic is clocked to the BCH-decoding logic 7, which can correct one bit and simultaneously detect several bit faults. Then the 3/5 logic stores the voting result into a register (not shown).

At the end of the fifth data block A5 (or B5 if block B was initially selected), the voting logic 8 contains the voting result and the output of the BCH decoding logic 7 supplies the syndrome 13 of the received data frame, the syndrome indicating whether the frame contained faults or whether it was correct. The syndrome is supplied to the correction block 9, which then at its first output presents the decoding result 11.

The processing of the frame continues during the first data block A1' of the next frame. During this new data block A1', the result of the prior frame is clocked out as voting result 15 from the voting logic 8, while the BCH decoding logic 7 is supplied with zeros. The buffer enable signal 3 permits 28 data content bits to be clocked into the buffer, the remaining 12 bits of the received 40 bit data block being parity bits.

If the BCH-logic 7 detects a fault to be corrected, it will change the status of the syndrome 13 outputs. The position of the fault is equal to the number of zeros clocked to the BCH-logic during the first repetition minus one (Position= N(0)−1). The correction block 9 will then detect the changes in the syndrome 13 and provide a correction signal 14 for the faulty bit, the corrected bit being then supplied to the buffer 10. Because the clocking of the voting result 15 and the zeros is simultaneous, it is possible to correct the faulty bit in synchronism with the clocking when the bit flow 15 is directed to the buffer 10 in serial mode.

During the clocking the 28 first 'checked and corrected' data content bits of the voting result 15 are supplied to the data buffer 10. The remaining 12 parity bits of the data block are checked by the BCH-block in order to find out whether there were faulty bits in the parity bits. The fault correction is seen in the decoding result, irrespective whether the correction is done in the data field or in the parity field.

The correction block 9 saves the decoding result in two bits. These bits indicate the quality of the received and decoded frame, i.e. whether it contained faults, was corrected, or faultless.

Through the output data bus 12 it is possible to read data from the buffer 10 to the processor (not shown) of the mobile phone immediately after the check, i.e. immediately after 40 bits have been clocked. The data saved in the buffer 10 is retained until the next voting result is clocked and checked. The data is kept without any changes, until the data from the next frame is clocked into the buffer.

A receiver counter (not shown) counts the bits in a received frame. At the end of a data block (a block of 40 bits) the counter circuit raises a repeat flag (RFLAG), which causes an interrupt to the mobile phone microprocessor, when interrupts are allowed. The processor counts the RFLAG interrupts. Thus this RFLAG is raised at the end of the repeating data block.

The receiver counter also produces a word flag (WFLAG), which indicates that the arrangement of FIG. 1 has processed 5 data blocks, and that the decoding result is ready to be read by the processor.

The arrangement is sychronized to the receiver clock. Other time divided bits contained in the frame are not clocked, as they are stopped or clocked with a multiplexer/ flip-flop unit.

The decoding logic is based on a flip-flop construction, which enables a continuous clocking operation synchronously with the incoming bit stream. It is also noted from the figure and from the above description, that no extra clock nor an increase in the frequency of the shown clock is required for the described operation. Also advantageously, no separate resetting phase is required between reception of frames, this providing for an extremely simple logic arrangement.

Turning now to FIG. 2, there is shown the timing of the essential signals of the arrangement in FIG. 1. On the first line is shown an FOCC signal represented by a bit stream. This bit stream is divided into a bit synchronization block (10 bits), a word synchronization block (11 bits), and repeating words A1 . . . A5 and B1 . . . B5, containing 40 bits each, of which 28 bits are data and 12 bits parity. FIG. 2 also shows how each word A1 . . . A5 is clocked into the 3/5 voting logic by the bit enable signal 4. In fact the word block contains 43 bits, that is 40 data bits and 3 busy/idle bits B/I, as mentioned above referring to FIG. 3. These B/I-bits are not clocked into the voting logic, which receives only 40 data bits. During the first repeated word A1 the word signal 5 enables the internal feedback to be disconnected, so that effectively data bits collected and voted during the previous frame will have no effect on data bits of the current frame. The words A1 . . . A4 are then received by the voting logic 8 (FIG. 1). During the fifth word A5 the 3/5 voting result 6 is clocked to the BCH decoding logic. Now that five repeated words A1 . . . A5 of the set have been received in the voting block, the next (frame) can be received, as is indicated by the word A1' (of the next set, in FIG. 2). The result of the frame just received is now, during the next word A1', processed further by clocking the result through line 15 to the buffer, which is enabled by the signal 3 during the 28 data bits. The 28 data bits are corrected with the correction signal 14 and then clocked out to the data bus 12. The operation is in synchronism with the received data bit frequency on line 1.

The data is received by the arrangement shown in FIG. 1 without any control from the mobile phone processor during BCH decoding and 3/5-voting. Thus it is possible to stop the processor operation during this process, in order to save battery power.

In the TACS/AMPS mobile phone system the Forward Voice Channel (FCV) is sent to the mobile phone as a framed structure, where a frame contains the voice channel data as data blocks, repeated 11 times within a frame. Normally at least 5 of these data blocks must be received in order to perform a 3/5 voting and a BCH-decoding to correct incidental bit faults. The inventive arrangement can be implemented to this end in the same manner as for the case of the FOCC channel reception described above.

In a preferred case the inventive arrangement can advantageously be used to increase the receiving quality of the FVC channel. Then the data blocks are received and processed in two sets by the inventive arrangement. The first five received data blocks (out of the blocks 1 . . . 5 or of 1 . . . 6) are processed as above; then the procedure is repeated for next received five data blocks (out of blocks 6 . . . 10 or of 6 . . . 11). One block is redundant. The two results are stored, and the better result is selected for further processing by the mobile phone. The quality of each result can be seen e.g. from status bits of the decoding result output (11 in FIG. 1) of the correction block (9 in FIG. 1). If e.g. one result shows that the received data contains faults, and the second result shows that the corresponding data is correct, then the correct data is selected by the microprocessor of the mobile phone. The increased reliability requires that at least ten data blocks can be received. This increases the reception quality, especially in reception fields of medium strength, and the mobile phone user experiences fewer and shorter breaks and disturbances. If only nine or fewer data blocks in a frame are correctly received, then the data is captured with 'normal' quality.

The arrangement and the above principles of the decoding could also be applied to a CLI message sent on the voice channel.

The above description concerns only illustrating examples, and a person skilled in the art is able to modify the arrangement in many ways, based on the teaching of this description, the scope of the invention thus being limited only by the claims set forth below.

We claim:

1. A synchronous and continuous data decoding circuit in a mobile phone for performing three-out-of-five (3/5) voting on each of a plurality of data frames, each of said plurality of data frames comprising at least five repeated data blocks, the data decoding circuit comprising:

a 3/5 voting logic circuit which receives a first frame of repeated data blocks when a bit enable signal is enabled, the 3/5 voting logic circuit including means for performing 3/5 voting on the at least five repeated data blocks in the first frame to produce a bit-wise voting result during the fifth data block of said at least five repeated data blocks in the first frame, the 3/5 voting logic circuit also including means for storing the bit-wise voting result;

a decoding circuit which receives on a bit-by-bit basis the bit-wise voting result from the 3/5 voting means of the 3/5 voting logic circuit and generates a first frame syndrome at the end of the fifth data block of the first frame, the decoding circuit also creating first frame correction information during the first repeated data block of a second frame;

a correction circuit which receives the first frame syndrome and the correction information from the decoding circuit during the first repeated data block of the second frame and produces a decoding result and a bit correction signal; and a data buffer which receives during the first repeated data block of the second frame the bit-wise voting result from the 3/5 voting logic circuit and the bit correction signal from the correction circuit, the data buffer utilizing the bit correction signal to correct the bit-wise voting result to produce corrected data which is loaded into the data buffer and subsequently output as a corrected first frame data stream during the first repeated data block of the second frame.

2. A synchronous and continuous data decoding circuit according to claim 1, wherein the decoding circuit is a BCH decoding circuit.

3. A synchronous and continuous data decoding circuit according to claim 2, wherein the 3/5 voting logic circuit and the data buffer are each provided with a clock signal for maintaining synchronism between the synchronous and continuous data decoding circuit, and the plurality of data frames.

4. A synchronous and continuous data decoding circuit according to claim 3 wherein the plurality of data frames comprise Forward Control Channel (FOCC) data.

5. A synchronous and continuous data decoding circuit according to claim 4 wherein the plurality of data frames comprise Forward Voice Channel (FVC) data.

6. A synchronous and continuous data decoding circuit according to claim 5 wherein each individual frame of the plurality of data frames is repeated two times, the correction circuit further including means for indicating a quality for each individual frame and each repeated frame to allow selection of a higher quality frame from among the individual frame and the repeated frame.

7. A synchronous and continuous data decoding circuit according to claim 6 further including a microprocessor controllably connected to the data decoding circuit, wherein the microprocessor includes means for substantially halting the microprocessor during a portion of each time period in which the data decoding circuit is operating.

8. A synchronous and continuous data decoding circuit according to claim 2 wherein the plurality of data frames comprise Forward Control Channel (FOCC) data.

9. A synchronous and continuous data decoding circuit according to claim 8 wherein the plurality of data frames comprise Forward Voice Channel (FVC) data.

10. A synchronous and continuous data decoding circuit according to claim 9 wherein each individual frame of the plurality of data frames is repeated two times, the correction circuit further including means for indicating a quality for each individual frame and each repeated frame to allow selection of a higher quality frame from among the individual frame and the repeated frame.

11. A synchronous and continuous data decoding circuit according to claim 10 further including a microprocessor controllably connected to the data decoding circuit, wherein the microprocessor includes means for substantially halting the microprocessor during a portion of each time period in which the data decoding circuit is operating.

* * * * *